US011682998B2

(12) United States Patent
Kima et al.

(10) Patent No.: US 11,682,998 B2
(45) Date of Patent: Jun. 20, 2023

(54) MOTOR CONTROL METHOD AND MOTOR CONTROL APPARATUS

(71) Applicant: NISSAN MOTOR CO., LTD., Yokohama (JP)

(72) Inventors: Takayuki Kima, Kanagawa (JP); Mitsuhiro Shouji, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/630,966

(22) PCT Filed: Aug. 27, 2020

(86) PCT No.: PCT/JP2020/032483
§ 371 (c)(1),
(2) Date: Jan. 28, 2022

(87) PCT Pub. No.: WO2022/044231
PCT Pub. Date: Mar. 3, 2022

(65) Prior Publication Data
US 2022/0368267 A1 Nov. 17, 2022

(51) Int. Cl.
*H02P 27/12* (2006.01)
*H02P 21/22* (2016.01)
*H02P 27/08* (2006.01)

(52) U.S. Cl.
CPC ............. *H02P 27/12* (2013.01); *H02P 21/22* (2016.02); *H02P 27/085* (2013.01)

(58) Field of Classification Search
CPC ........ H02P 27/12; H02P 21/22; H02P 27/085; H02P 6/08; H02P 21/14; H02P 21/20
(Continued)

(56) References Cited

U.S. PATENT DOCUMENTS 5,121,043 A     6/1992  Kerkman et al.
8,063,596 B2 *  11/2011 Imura .................. B60L 15/025
                                        318/434
(Continued)

FOREIGN PATENT DOCUMENTS

JP      2003-309993 A    10/2003
WO   WO 2011/040159 A1    4/2011
(Continued)

*Primary Examiner* — David Luo
(74) *Attorney, Agent, or Firm* — Foley & Lardner LLP

(57) ABSTRACT

A motor control method for controlling a motor by using an applied AC voltage converted from a DC voltage with an inverter driven by a PWM control, the motor control method includes: calculating a voltage command value for the inverter in order to achieve a desired torque output in the motor; calculating a compensation gain configured to maintain a linear relation between the voltage command value and the applied AC voltage according to a modulation factor indicating a ratio of the applied AC voltage to the DC voltage before and after a conversion in the inverter; limiting the compensation gain using an upper limit value; calculating a compensation voltage command value by multiplying the voltage command value by the limited compensation gain; and applying the applied AC voltage to the motor by driving the inverter using the compensation voltage command value; wherein the upper limit value is set so that the upper limit value become smaller when the modulation factor changes significantly.

7 Claims, 13 Drawing Sheets

(58) Field of Classification Search
USPC .............................. 318/400.02, 400.01, 700
See application file for complete search history.

(56) References Cited

U.S. PATENT DOCUMENTS

| | | |
|---|---|---|
| 2011/0074320 A1 | 3/2011 | Nakamura et al. |
| 2015/0035461 A1 | 2/2015 | Shouji et al. |
| 2021/0028733 A1 | 1/2021 | Mizuguchi et al. |

FOREIGN PATENT DOCUMENTS

| | | |
|---|---|---|
| WO | WO 2013/137129 A1 | 9/2013 |
| WO | WO 2019/176109 A1 | 9/2019 |

* cited by examiner

CTRL_mode

| | | | | VOLTAGE PHASE CONTROL | | | | |
|---|---|---|---|---|---|---|---|---|
| | CURRENT VECTOR CONTROL | | | | | | | |
| | | | | | | | | |

$K_{upper}$

| | | | | | | $K_{upper\_Volt}$ | | |
|---|---|---|---|---|---|---|---|---|
| | | $K_{upper\_Current}$ | | | | | | |
| | | | | | | | | |

MOTOR CONTROL METHOD AND MOTOR CONTROL APPARATUS

TECHNICAL FIELD

The present invention relates to a motor control method and a motor control apparatus.

BACKGROUND ART

In order to supply AC power to an AC motor, DC power supplied from a DC power source is converted to AC power and supplied by operating an inverter controlled by a PWM (Pulse Width Modulation) control. Such PWM control may become an overmodulation control in which a modulation factor, that is the ratio of AC voltage output to DC voltage input, exceed "1".

In order to maintain the controllability of the motor, it is desirable that the voltage command value for the motor, which is the target to be controlled, and the applied voltage actually applied to the motor are in a proportional relation, and have linear responsiveness indicated by a linear function. The overmodulation control causes a voltage drop. The voltage command value is, therefore, multiplied by a compensation gain in advance so that the linear responsiveness is maintained in order to compensate for the voltage drop.

Here, the modulation factor in the PWM control may change and temporarily increase due to the influence of harmonics or the like. If the voltage command value is multiplied by the compensation gain in advance in consideration of the voltage drop, the voltage applied to the AC motor may exceed an appropriate range when the modulation factor temporarily increases. Further, when feedback control is performed in a control apparatus, since the output from the motor is not appropriate, there is a risk that the command value cannot be generated appropriately. Therefore, there is known a technique for maintaining linear responsiveness by setting an upper limit for the compensation gain (WO2019/176109A1).

SUMMARY OF INVENTION

However, the frequency of occurrence and range of fluctuation in the change of the modulation factor differ depending on the PWM control method. Thus, if the upper limit of compensation gain is set uniformly, there is a problem that linear responsiveness may fail to be maintained. The object of the present invention is to provide a motor control method for maintaining linear responsiveness in order to solve the above problem.

One aspect of the present invention is a motor control method for controlling a motor by using an applied AC voltage converted from a DC voltage with an inverter driven by a PWM control. The method includes: calculating a voltage command value for the inverter in order to achieve a desired torque output in the motor; calculating a compensation gain configured to maintain a linear relation between the voltage command value and the applied AC voltage according to a modulation factor indicating a ratio of the applied AC voltage to the DC voltage before and after a conversion in the inverter; limiting the compensation gain using an upper limit value; calculating a compensation voltage command value by multiplying the voltage command value by the limited compensation gain; and applying the applied AC voltage to the motor by driving the inverter using the compensation voltage command value; wherein the upper limit value is set so that the upper limit value become smaller when the modulation factor changes significantly.

BRIEF DESCRIPTION OF DRAWINGS

FIG. 7 is a timing chart at a time of switching an upper limit value of compensation gain.

DESCRIPTION OF EMBODIMENTS

Embodiments of the present invention will be described below with reference to the drawings. Further, in the following description, for the sake of brevity, three-phase components and d-q coordinate components, such as current and voltage, are collectively referred to as "dq-axis current value $(i_d, i_q)$" and "three-phase current value $(i_u, i_v, i_w)$", etc. as necessary.

First Embodiment

Hereinafter, the first embodiment of the present invention will be described.

Figure 1:
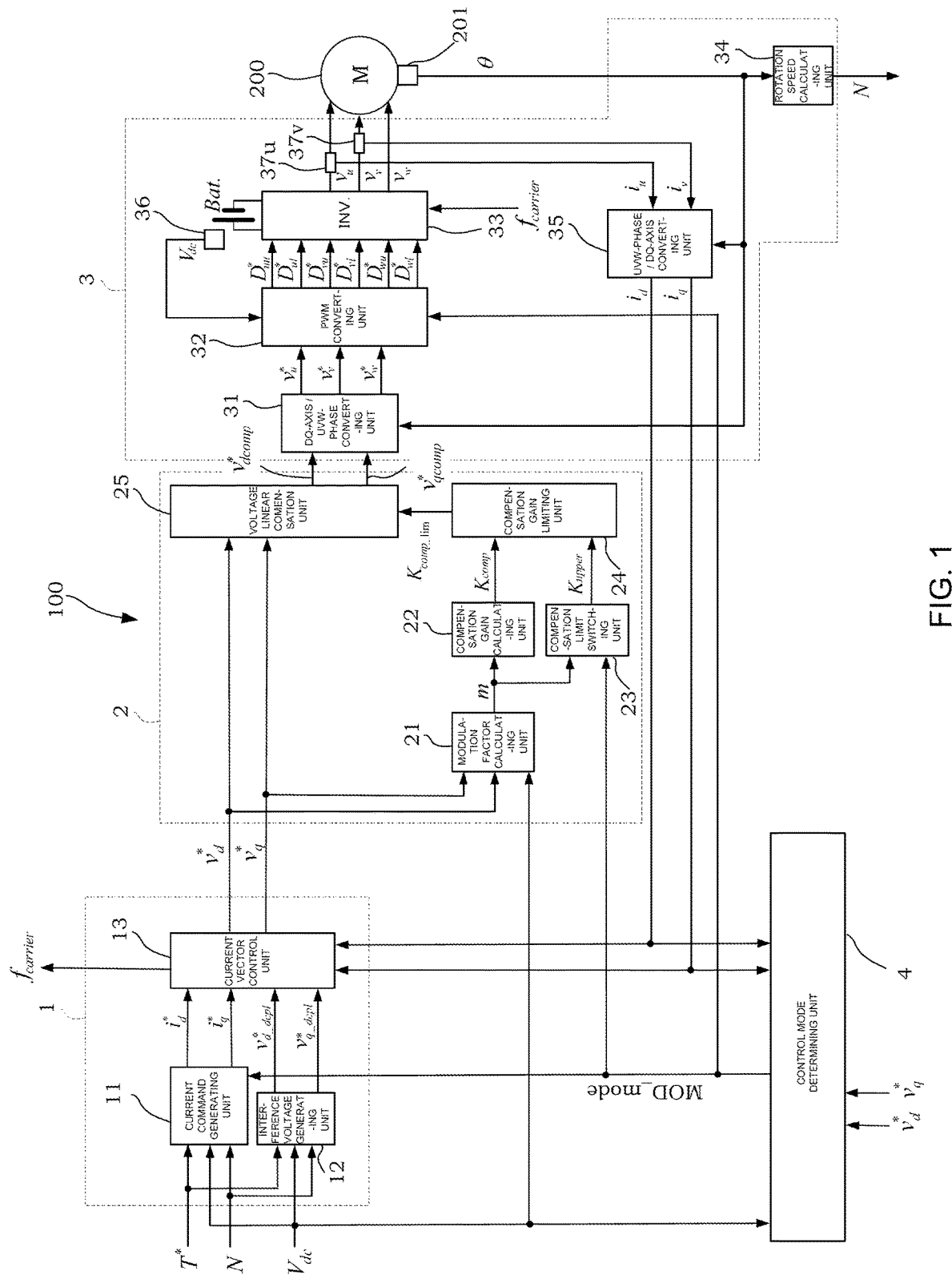
FIG. 1 is a schematic configuration diagram illustrating a motor control apparatus according to a first embodiment.

FIG. 1 is a schematic configuration diagram illustrating a motor control apparatus 100 according to the first embodiment. That is, the motor control method of this embodiment is executed by the control apparatus 100.

As illustrated, the control apparatus 100 of this embodiment is an apparatus that controls operation of a motor 200 which is an electric motor mounted on an electric vehicle or the like and connected to drive wheels of the vehicle. Particularly, the control apparatus 100 controls the motor 200 according to a torque command value T*, which is determined based on the depression amount of an accelerator pedal (not illustrated), etc.

The control apparatus 100 of this embodiment includes: a voltage command value calculating unit 1 that calculates a dq-axis voltage command value $(v_d^*, v_q^*)$ based on the torque command value T*; a voltage compensation processing unit 2 that performs a linear compensating process based on a modulation factor "m"; an output control unit 3 that applies a voltage to the motor 200 based on a compensated dq-axis voltage command value $(v_{dcomp}^*, v_{qcomp}^*)$, which is the voltage command value after the linear compensating process; and a control mode determining unit 4 that determines a control mode based on a driving state of the motor 200. Further, in this embodiment, the control mode determining unit 4 determines whether a PWM control performed in the output control unit 3 is to be performed by a synchronous PWM control or an asynchronous PWM control.

The voltage command value calculating unit 1, voltage compensation processing unit 2, output control unit 3, and control mode determining unit 4 are realized by one computer or a plurality of computers equipped with various computational/control devices such as CPU, various storage devices such as ROM and RAM, and input/output interfaces, etc. Hereinafter, the voltage command value calculating unit 1, voltage compensation processing unit 2, output control unit 3 and control mode determining unit 4 will be described in detail.

The voltage command value calculating unit 1 includes a current command generating unit 11, an interference voltage generating unit 12, and a current vector control unit 13.

The current command generating unit 11 receives the torque command value T*, a DC voltage $V_{dc}$ which is the power supply voltage used to drive the output control unit 3, a motor rotation speed N output from a rotation speed calculating unit 34, and a modulation mode signal MOD_mode output from the control mode determining unit 4. Then, the current command generating unit 11 calculates the d-axis current command value $i_d^*$ and q-axis current command value $i_q^*$ based on these inputs.

Specifically, the modulation mode signal MOD_mode indicates to perform either a synchronous PWM control or an asynchronous PWM control. The current command generating unit 11 calculates the dq-axis current command value $(i_d^*, i_q^*)$ based on a predetermined table, which is a table provided for each control mode and defines the relation between the dq-axis current command value $(i_d^*, i_q^*)$ and the torque command value T*, DC voltage $V_{dc}$, and motor rotation speed N. In addition, this table, for example, has predetermined the dq-axis current command value $(i_d^*, i_q^*)$, which is suitable from the viewpoint of obtaining a desired torque at a predetermined motor temperature with respect to the motor rotation speed N and torque command value T*, by an experimental or analytical method.

Then, the current command generating unit 11 outputs the calculated dq-axis current command value $(i_d^*, i_q^*)$ to the current vector control unit 13.

The interference voltage generating unit 12 acquires the torque command value T*, the DC voltage $V_{dc}$ which is the power supply voltage used to drive the output control unit 3, and the motor rotation speed N. The interference voltage generating unit 12 calculates d-axis interference voltage $V_{d\_dcpl}^*$ and q-axis interference voltage $V_{q\_dcpl}^*$ which suppress the speed electromotive force term that interfere with each other between d-axis and q-axis in control of the motor 200, on the basis of the torque command value T*, the DC voltage $V_{dc}$, and the motor rotation speed N, and by using the table predetermined by experiment or analysis. The interference voltage generating unit 12 outputs the calculated dq-axis interference voltage $(V_{d\_dcpl}^*, V_{q\_dcpl}^*)$ to the current vector control unit 13.

The current vector control unit 13 receives the dq-axis current command value $(i_d^*, i_q^*)$ from the current command generating unit 11, and receives the dq-axis interference voltage $(V_{d\_dcpl}^*, V_{q\_dcpl}^*)$ from the interference voltage generating unit 12. Further, the current vector control unit 13 receives the d-axis current value $i_d$ and the q-axis current value $i_q$, which are the output currents of the motor 200, from a UVW-phase/dq-axis converting unit 35 in the output control unit 3.

The current vector control unit 13 calculates the d-axis voltage command value $v_d^*$ and q-axis voltage command value $v_q^*$ on the basis of the dq-axis current value $(i_d, i_q)$, dq-axis current command value $(i_d^*, i_q^*)$, and dq-axis interference voltage $(V_{d\_dcpl}^*, V_{q\_dcpl}^*)$ so that the dq-axis current value $(i_d, i_q)$ obtained by the UVW-phase/dq-axis converting unit 35 approaches the dq-axis current command value $(i_d^*, i_q^*)$ by performing a non-interference control and a current vector control using a current feedback control. Then, the current vector control unit 13 outputs the calculated dq-axis voltage command value $(v_d^*, v_q^*)$ to a modulation factor calculating unit 21 and a voltage linear compensation unit 25 in the voltage compensation processing unit 2.

Further, as shown in the modulation mode signal MOD_mode, in the output control unit 3, a PWM control, which is either a synchronous PWM control or an asynchronous PWM control, is performed. Regarding a synchronous PWM control, a single carrier frequency with a predetermined period is used in the PWM control by the output control unit 3. Regarding an asynchronous PWM control, a plurality of carrier frequencies is used by changing the frequency in a predetermined period in the PWM control by the output control unit 3.

Therefore, in the voltage command value calculating unit 1, a carrier frequency $f_{carrier}$ is determined based on a control mode, and the determined carrier frequency $f_{carrier}$ is output to the output control unit 3 (inverter 33). Further, in this embodiment, the carrier frequency $f_{carrier}$ is output from the current vector control unit 13, and that is because the outputs from the voltage command value calculating unit 1 are aggregated into the current vector control unit 13. Specifically, the carrier frequency $f_{carrier}$ is output from the current vector control unit 13 after being determined in the current command generating unit 11.

The voltage compensation processing unit 2 includes the modulation factor calculating unit 21, a compensation gain calculating unit 22, a compensation limit switching unit 23, a compensation gain limiting unit 24, and the voltage linear compensation unit 25.

The modulation factor calculating unit 21 acquires the DC voltage $V_{dc}$ and receives the dq-axis voltage command value $(v_d^*, v_q^*)$ from the current vector control unit 13. The modulation factor calculating unit 21 calculates the modulation factor m from the DC voltage $V_{dc}$ and the dq-axis voltage command value $(v_d^*, v_q^*)$ based on the following Equations (1) and (2).

[Equation 1]

$$m = \frac{\sqrt{2} \cdot V_a^*}{V_{dc}} \quad (1)$$

Here, $V_a^*$ means the amplitude of the dq-axis voltage command value $(v_d^*, v_q^*)$. Hereinafter, $V_a^*$ will be referred to as "voltage amplitude command value $V_a^*$". That is, the voltage amplitude command value $V_a^*$ is determined by the following Equation (2).

[Equation 2]

$$V_a^* = \sqrt{(V_d^*)^2 + (V_q^*)^2} \qquad (2)$$

That is, the modulation factor m is a parameter obtained as the ratio of the magnitude (effective value) of the dq-axis voltage command value ($v_d^*$, $v_q^*$) to the DC voltage $V_{dc}$, and corresponds to the ratio of the effective value of the AC voltage after conversion to the DC voltage before conversion, wherein the conversion is performed by the PWM control in the output control unit 3. Therefore, the region where the modulation factor m is 1 or less is a normal modulation region where the DC voltage $V_{dc}$ has a margin for the dq-axis voltage command value ($v_d^*$, $v_q^*$), and the region where the modulation factor m exceeds 1 is an overmodulation region. Then, the modulation factor calculating unit 21 outputs the modulation factor m to the compensation gain calculating unit 22 and the compensation limit switching unit 23.

The compensation gain calculating unit 22 receives the modulation factor m from the modulation factor calculating unit 21. The compensation gain calculating unit 22 sets the compensation gain $K_{comp}$ on the basis of the modulation factor m with reference to the modulation factor-compensation gain table stored in advance in an unillustrated memory or the like of the control apparatus 100.

Figure 2:
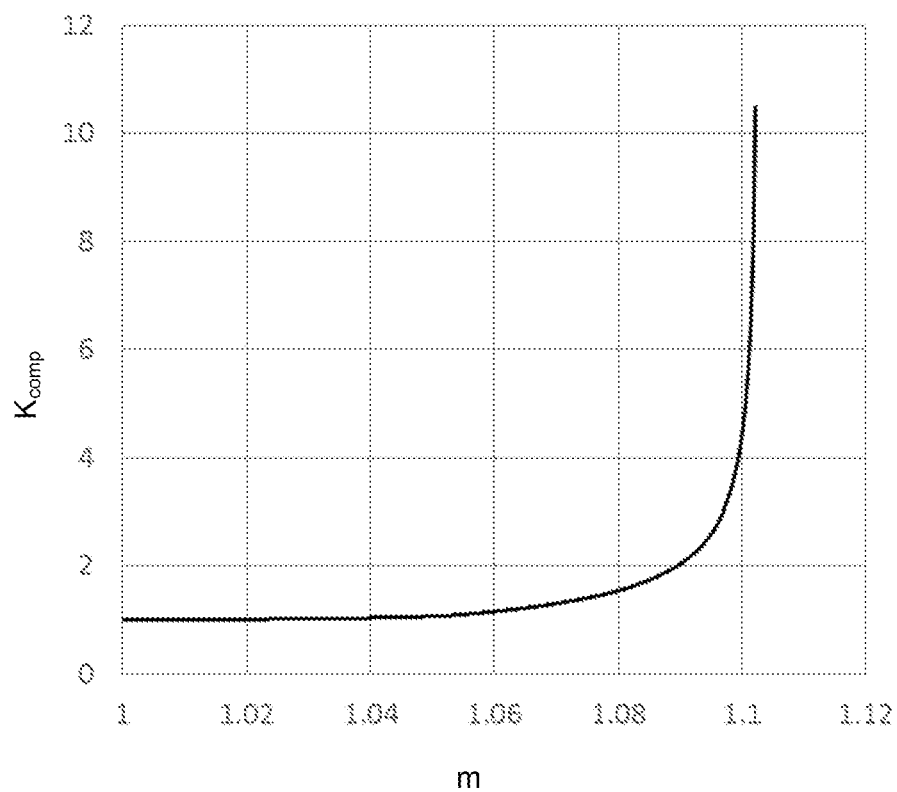
FIG. 2 is a diagram describing an example of a method of setting a compensation gain.

FIG. 2 is a graph illustrating a modulation factor-compensation gain table. This figure shows the compensation gain $K_{comp}$ which is set according to the modulation factor m (modulation factor-compensation gain table). When the modulation factor is 1 or more, the compensation gain $K_{comp}$, which increases as the modulation factor m increases, is set to be 1 or more.

When the modulation factor is 1 or more, the reason why the compensation gain $K_{comp}$ is set to be 1 or more is as follows. In the overmodulation region where the modulation factor m 1, the magnitude of the three-phase voltage command value ($v_u^*$, $v_v^*$, $v_w^*$) based on the dq-axis voltage command value ($v_d^*$, $v_q^*$) exceeds the limit due to the DC voltage $V_{dc}$, and thus, the output voltage to the motor 200 cannot be completely adjusted to the three-phase voltage command value ($v_u^*$, $v_v^*$, $v_w^*$). For this reason, there occurs a voltage drop, in which the peak portion of the waveform of the output voltage to the motor 200 is missing in a trapezoidal shape with respect to the waveform of the three-phase voltage command value ($v_u^*$, $v_v^*$, $v_w^*$).

Therefore, in the overmodulation region, a value greater than 1 is set as the compensation gain $K_{comp}$ for the three-phase voltage command value ($v_u^*$, $v_v^*$, $v_w^*$). Thereby, the decrease in output due to the voltage drop can be suppressed, and as a result, the linear responsiveness in the control of the motor 200 can be maintained.

Further, in the normal modulation region where the modulation factor is smaller than 1, voltage drop does not occur and compensation is not required, and thus, 1 is set as the compensation gain $K_{comp}$.

The compensation limit switching unit 23 receives the modulation factor m from the modulation factor calculating unit 21 and the modulation mode signal MOD_mode from the control mode determining unit 4. Here, the modulation mode signal MOD_mode indicates that a control of either asynchronous PWM control or synchronous PWM control is performed. Therefore, the compensation limit switching unit 23 sets the compensation gain upper limit value $K_{upper}$ according to the following table.

TABLE 1

| MOD_mode | $K_{upper}$ |
| --- | --- |
| asynchronous PWM control | $K_{upper\_Async}$ |
| synchronous PWM control | $K_{upper\_Sync}$ |

That is, $K_{upper\_Async}$ is set as the compensation gain upper limit value $K_{upper}$ when an asynchronous PWM control is performed, and $K_{upper\_Sync}$ is set as the compensation gain upper limit value $K_{upper}$ when a synchronous PWM control is performed. In addition, $K_{upper\_Sync}$ is assumed to be larger than $K_{upper\_Async}$.

The compensation gain limiting unit 24 limits the compensation gain $K_{comp}$, which is output from the compensation gain calculating unit 22, so that the upper limit is the compensation gain upper limit value $K_{upper}$, and outputs the limited compensation gain $K_{comp\_lim}$ to the voltage linear compensation unit 25.

The voltage linear compensation unit 25 receives the limited compensation gain $K_{comp\_lim}$ from the compensation gain limiting unit 24. Then, the voltage linear compensation unit 25 calculates the compensated d-axis voltage command value $v_{dcomp}^*$ and the compensated q-axis voltage command value $v_{qcomp}^*$ based on the dq-axis voltage command value ($v_d^*$, $v_q^*$) and the limited compensation gain $K_{comp\_lim}$.

Specifically, the voltage linear compensation unit 25 first calculates the compensated dq-axis voltage command value ($v_{dcomp}^*$, $v_{qcomp}^*$) by using the dq-axis voltage amplitude command value ($v_d^*$, $v_q^*$) and the limited compensation gain $K_{comp\_lim}$ based on the following equation. The voltage linear compensation unit 25 outputs the calculated compensated dq-axis voltage command value ($v_{dcomp}^*$, $v_{qcomp}^*$) to the output control unit 3.

[Equation 3]

$$V_{dcomp}^* = V_d^* \cdot K_{comp\_lim} \quad V_{qcomp}^* = V_q^* \cdot K_{comp\_lim} \qquad (3)$$

The output control unit 3 includes a dq-axis/UVW-phase converting unit 31, a PWM converting unit 32, the inverter 33, the rotation speed calculating unit 34, the UVW-phase/dq-axis converting unit 35, and a voltage sensor 36.

The dq-axis/UVW-phase converting unit 31 receives the compensated dq-axis voltage command value ($v_{dcomp}^*$, $v_{qcomp}^*$) from the voltage linear compensation unit 25. Then, the dq-axis/UVW-phase converting unit 31 convert the compensated dq-axis voltage command value ($v_{dcomp}^*$, $v_{qcomp}^*$) to the three-phase voltage command value ($v_u^*$, $v_v^*$, $v_w^*$) based on the following equation by using an electrical angle θ of the rotor in the motor 200 detected by a position detection sensor 201 to be described later.

[Equation 4]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_{dcomp}^* \\ v_{qcomp}^* \end{bmatrix} \qquad (4)$$

The PWM converting unit 32 acquires the DC voltage $V_{dc}$ output from the voltage sensor 36 and the three-phase voltage command value ($v_u^*$, $v_v^*$, $v_w^*$) from the dq-axis/UVW-phase converting unit 31. The PWM converting unit 32 generates power element driving signals ($D_{uu}^*$, $D_{ul}^*$, $Dv_u^*$, $D_{vl}^*$, $D_{wu}^*$, $D_{wl}^*$) corresponding to ($v_u^*$, $v_v^*$, $v_w^*$) by dead time compensation processing and voltage utilization improvement processing. Then, the PWM converting unit 32 outputs the generated power element driving signals ($D_{uu}*$, $D_{ul}*$, $Dv_u*$, $D_{vl}*$, $D_{wu}*$, $D_{wl}*$) to the inverter 33.

The inverter 33 receives the carrier frequency $f_{carrier}$ from the voltage command value calculating unit 1 and power element driving signals ($D_{uu}*$, $D_{ul}*$, $Dv_u*$, $D_{vl}*$, $D_{wu}*$, $D_{wl}*$) from the PWM converting unit 32 in a state where the DC voltage $V_{dc}$ is supplied from a battery whose voltage is detected by the voltage sensor 36. The inverter 33 drives the power elements of an unillustrated drive circuit (three-phase bridge circuit) by comparing the magnitude relation between the carrier frequency $f_{carrier}$ and power element driving signals ($D_{uu}*$, $D_{ul}*$, $D_{vu}*$, $D_{vl}*$, $D_{wu}*$, $D_{wl}*$). Thereby, it is possible to pseudo-convert the DC voltage $V_{dc}$ into a three-phase AC voltage ($v_u$, $v_v$, $v_w$) and apply it to the motor 200.

The U-phase current $i_u$, V-phase current $i_v$, and W-phase current $i_w$, are output to the motor 200 in each phase according to the three-phase AC voltage ($v_u$, $v_v$, $v_w$) applied by the inverter 33, and the desired output torque is achieved.

Further, the motor 200 is provided with the position detection sensor 201 which detects the electrical angle θ of the rotor. The electrical angle θ detected by the position detection sensor 201 is output to the dq-axis/UVW-phase converting unit 31, rotation speed calculating unit 34, and UVW-phase/dq-axis converting unit 35.

The rotation speed calculating unit 34 calculates the motor rotation speed N based on the amount of change in the electrical angle θ per unit time (=motor angular velocity) acquired from the position detection sensor 201. The rotation speed calculating unit 34 outputs the motor rotation speed N to the current command generating unit 11 and the interference voltage generating unit 12.

Between the inverter 33 and the motor 200, a current sensor 37u is provided for the U-phase wiring, and a current sensor 37v is provided for the V-phase wiring. The U-phase current $i_u$ detected by the U-phase current sensor 37u and the V-phase current $i_v$ detected by the V-phase current sensor 37v are output to the UVW-phase/dq-axis converting unit 35.

The UVW-phase/dq-axis converting unit 35 calculates the dq-axis current value ($i_d$, $i_q$) based on the electrical angle θ from the position detection sensor 201, the U-phase current $i_u$ from the current sensor 37u, and the V-phase current $i_v$ from the current sensor 37v.

Specifically, first, the UVW-phase/dq-axis converting unit 35 calculates the W-phase current $i_w$, based on the following equation.

[Equation 5]

$$i_w = -i_u - i_v \qquad (5)$$

That is, the U-phase current $i_u$, V-phase current $i_v$, and W-phase current $i_w$, differ from each other in phase by 120°, and thus, the W-phase current $i_w$, can be determined by Equation (5) based on the U-phase current $i_u$ and V-phase current $i_v$.

In addition, the UVW-phase/dq-axis converting unit 35 converts the three-phase current value ($i_u$, $i_v$, $i_w$) to the dq-axis current value ($i_d$, $i_q$) using the following equation based on the electrical angle θ.

[Equation 6]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \qquad (6)$$

The UVW-phase/dq-axis converting unit 35 feeds back the obtained dq-axis current value ($i_d$, $i_q$) to the current vector control unit 13.

The control mode determining unit 4 receives the DC voltage $V_{dc}$ from the voltage sensor 36, the dq-axis voltage command value ($v_d*$, $v_q*$) from the current vector control unit 13, and the dq-axis current value ($i_d$, $i_q$) from the UVW-phase/dq-axis converting unit 35. Then, the control mode determining unit 4 selects whether to perform a synchronous PWM control or an asynchronous PWM control based on whether or not the relation among these parameters satisfies a predetermined condition. For example, asynchronous PWM control is selected when an overmodulation control, which requires a voltage higher than the DC voltage $V_{dc}$ to be applied to the motor 200, is performed. The control mode determining unit 4 outputs a modulation mode signal MOD_mode indicating the selected PWM control method to the current command generating unit 11, compensation limit switching unit 23, and PWM converting unit 32.

Here, a series of gain compensation controls performed by the compensation limit switching unit 23, the compensation gain limiting unit 24, and the voltage linear compensation unit 25 will be described with reference to FIG. 3.

Figure 3:
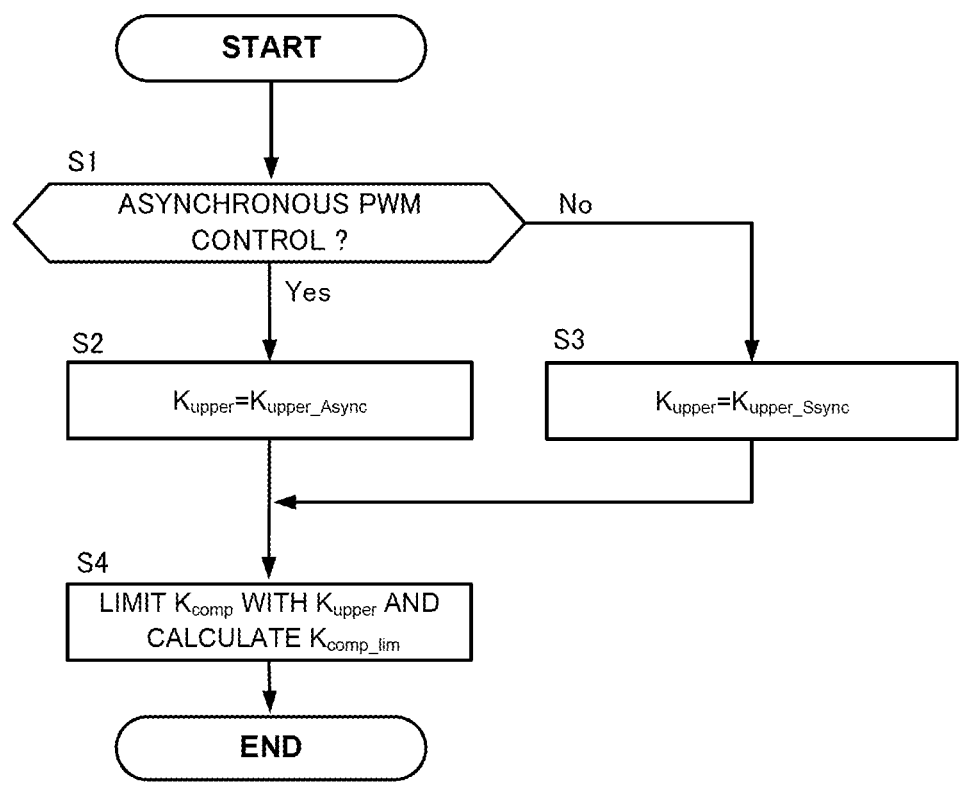
FIG. 3 is a flowchart illustrating a gain compensation control.

FIG. 3 is a flowchart illustrating a gain compensation control. A gain compensation control is performed by executing a program stored in the control mode determining unit 4.

In Step S1, the compensation limit switching unit 23 determines whether or not the control mode indicated by the modulation mode signal MOD_mode is asynchronous PWM control. Then, when an asynchronous PWM control is performed (S1: Yes), the process of Step S2 is performed next. When no asynchronous PWM control is performed (a synchronous PWM control is performed) (S1: No), the process of Step S3 is performed next.

In Step S2, the compensation limit switching unit 23 sets $K_{upper\_Async}$ as the compensation gain upper limit value $K_{upper}$. In Step S3, the compensation limit switching unit 23 sets $K_{upper\_Sync}$ as the compensation gain upper limit value $K_{upper}$. Further, since $K_{upper\_Sync}$ is larger than $K_{upper\_Async}$, $K_{upper\_Sync}$ may be obtained by adding a predetermined value to $K_{upper\_Async}$ or multiplying $K_{upper\_Async}$ by a predetermined ratio. These settings follow Table 1.

In Step S4, the compensation gain limiting unit 24 limits the compensation gain $K_{comp}$, which is output from the compensation gain calculating unit 22, so that the upper limit is to be the compensation gain upper limit value $K_{upper}$, and calculates the limited compensation gain $K_{comp\_lim}$.

In addition, when a mode switching indicated by the modulation mode signal MOD_mode is detected, the compensation limit switching unit 23 switches the setting value of the compensation gain upper limit value $K_{upper}$ between $K_{upper\_Async}$ and $K_{upper\_Sync}$, and the switching may be performed so as to change gradually instead of in a pulsed manner.

Figure 4:
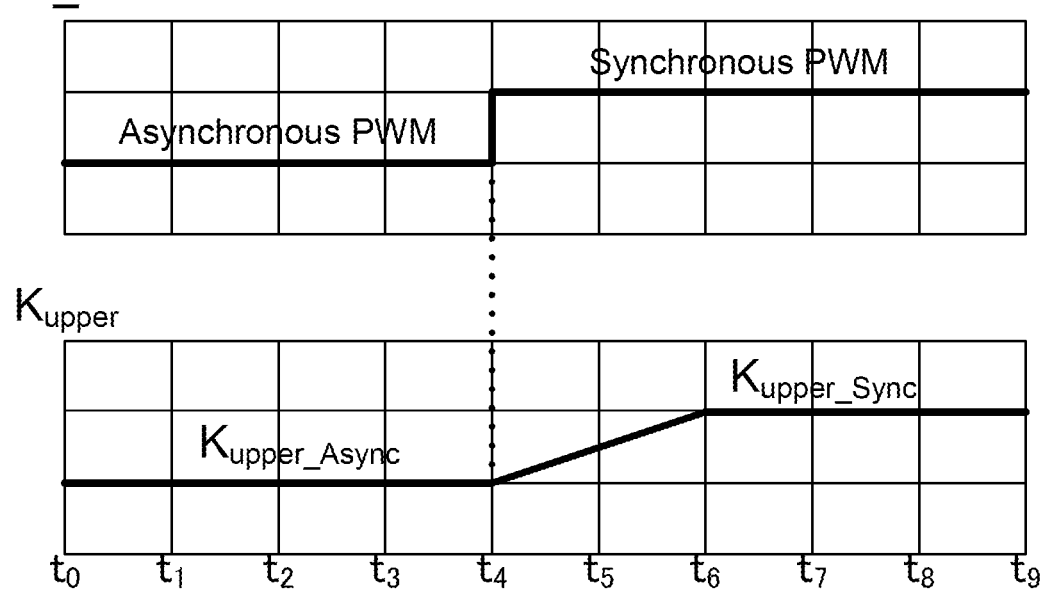
FIG. 4 is a timing chart at a time of switching an upper limit value of compensation gain.

FIG. 4 is a timing chart at the time of switching the compensation gain upper limit value $K_{upper}$. According to this figure, it is assumed that the control mode is switched from asynchronous PWM control to synchronous PWM control at time $t_4$. In such a case, $K_{upper\_Async}$ is set as $K_{upper}$ from time to to $t_4$. Then, after switching the control mode, from time $t_4$ to $t_6$, $K_{upper}$ changes in a manner of gradually increasing from $K_{upper\_Async}$ to $K_{upper\_Sync}$, and $K_{upper}$ becomes $K_{upper\_Sync}$ at time $t_6$. By gradually switching $K_{upper}$ in this way, a sudden change in the upper limit value can be suppressed, and thus, the stability of control can be improved.

Note that $K_{upper\_Sync}$ may be set much larger than $K_{upper\_Async}$. This is because when a synchronous PWM processing is performed, the modulation factor m is 1 or less and the need for limiting the compensation gain $K_{comp}$ is extremely low. Therefore, in FIG. 3, when a synchronous PWM control is performed without performing an asynchronous PWM control (S1: No), the linear responsiveness can be maintained in a wider range of voltage when the compensation gain $K_{comp}$ is limited using the relatively large $K_{upper\_Sync}$.

In addition, as another example, in FIG. 3, when an asynchronous PWM control is not performed (S1: No), the limitation processing of Step S4 does not need to be performed. In the case of this example, the compensation gain limiting unit 24 outputs the compensation gain $K_{comp}$ as the limited compensation gain $K_{comp\_lim}$ to the voltage linear compensation unit 25. When a synchronous PWM processing is performed, the modulation factor m is 1 or less and the need for limiting the compensation gain $K_{comp}$ is extremely low, and thus, when a synchronous PWM control is performed, linear responsiveness can be maintained in a wider range of voltage by omitting the limitation processing on the compensation gain $K_{comp}$.

According to the first embodiment as described above, the following effects can be obtained.

In the control method of the motor 200 of the first embodiment, the voltage command value calculating unit 1 calculates the dq-axis voltage command value ($v_d^*$, $v_q^*$) based on the torque command value T*. In the voltage compensation processing unit 2, the compensation gain calculating unit 22 obtains the compensation gain $K_{comp}$ corresponding to the modulation factor of the applied voltage with respect to the DC voltage $V_{dc}$ (DC voltage) so that the magnitude relation between the dq-axis voltage command value ($v_d^*$, $v_q^*$) and the voltage applied to the motor 200 is proportional (linear responsiveness). The compensation gain limiting unit 24 calculates the limited compensation gain $K_{comp\_lim}$ by limiting the compensation gain $K_{comp}$ with the compensation gain upper limit value $K_{upper}$. Further, the voltage linear compensation unit 25 calculates the compensated dq-axis voltage command value ($v_{dcomp}^*$, $v_{qcomp}^*$) by multiplying the dq-axis voltage command value ($v_d^*$, $v_q^*$) by the limited compensation gain $K_{comp\_lim}$. Then, the compensation limit switching unit 23 sets the compensation gain upper limit value $K_{upper}$ smaller when the change in the modulation factor m is large.

When the change in the modulation factor m is large, if the relatively large compensation gain upper limit value $K_{upper}$ is used, the voltage applied from the inverter 33 to the motor 200 may become excessive, but by using the relatively small $K_{upper\_Async}$ as the compensation gain upper limit value $K_{upper}$ to limit the compensation gain $K_{comp}$, it is possible to suppress the application of an excessive voltage to the motor 200. As a result, changes in torque and current can be suppressed in the motor 200.

In the control method of the motor 200 of the first embodiment, when the change in the modulation factor m is large, the compensation limit switching unit 23 sets the compensation gain upper limit value $K_{upper}$ to a larger value, or the compensation gain limiting unit 24 outputs the limited compensation gain $K_{comp\_lim}$ without performing a limitation processing on the compensation gain $K_{comp}$.

When the change in the modulation factor m is small, the modulation factor m is unlikely to increase temporarily, and thus, by using the relatively large $K_{upper\_Sync}$ as the compensation gain upper limit value $K_{upper}$ to limit the compensation gain $K_{comp}$, the controllability of the motor 200 can be improved since the voltage range in which linear responsiveness can be ensured becomes large. In addition, since the modulation factor m is unlikely to increase temporarily, linear responsiveness can be ensured in the entire voltage range by omitting the limitation processing on the compensation gain $K_{comp}$.

In the control method of the motor 200 of the first embodiment, the control mode determining unit 4 selects either synchronous PWM control or asynchronous PWM control as the control to be performed in the PWM converting unit 32. Here, the asynchronous PWM control has a larger modulation factor m and a larger range of change in the modulation factor m during control as compared with the synchronous PWM control.

Therefore, when asynchronous PWM control is selected by the control mode determining unit 4, by using the relatively small $K_{upper\_Async}$ as the compensation gain upper limit value $K_{upper}$, the application of an excessive voltage to the motor 200 can be suppressed. As a result, changes in torque and current can be suppressed in the motor 200.

On the other hand, when synchronous PWM control is selected by the control mode determining unit 4, the relatively large $K_{upper\_Sync}$ is used as the compensation gain upper limit value $K_{upper}$ because the change in the modulation factor m is small. Thereby, the voltage range in which linear responsiveness can be ensured becomes large, and thus, the controllability of the motor 200 can be improved. Further, linear responsiveness may be ensured in the entire voltage range by omitting the limitation processing on the compensation gain $K_{eemp}$.

Second Embodiment

In the first embodiment, an example in which the compensation gain upper limit value $K_{upper}$ is set according to the control method of asynchronous PWM control or synchronous PWM control has been described, but the present invention is not limited to this. In the second embodiment, as another example, an example in which the compensation gain upper limit value $K_{upper}$ is set according to a control mode such as current vector control or voltage phase control will be described.

Figure 5:
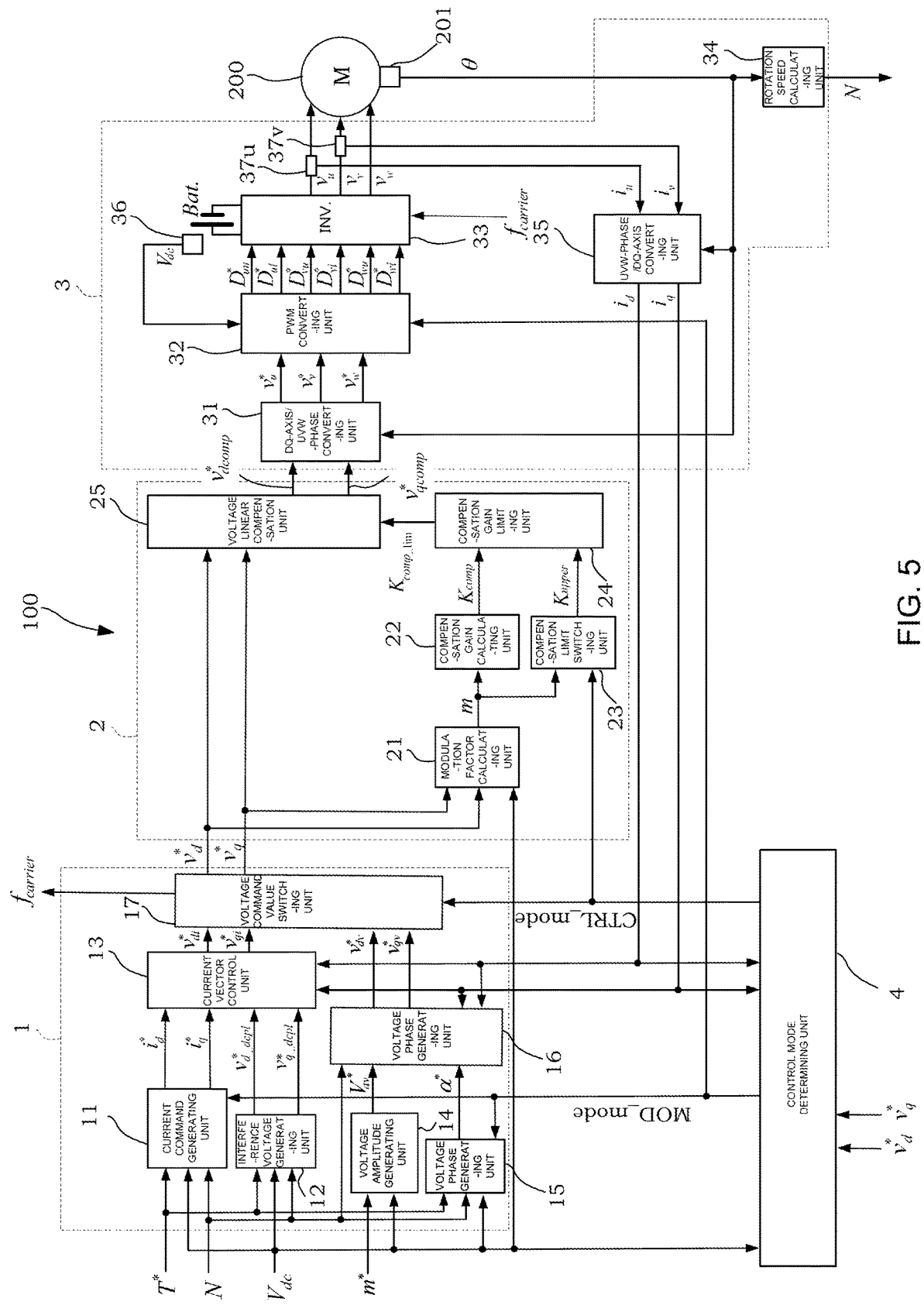
FIG. 5 is a schematic configuration diagram illustrating a motor control apparatus according to a second embodiment.

FIG. 5 is a schematic configuration diagram illustrating the control apparatus 100 of the motor 200 in the second embodiment. According to this schematic configuration diagram, as compared with the schematic configuration diagram of FIG. 1 in the first embodiment, there are differences in the detailed configuration of the voltage command value calculating unit 1, the input to the compensation limit switching unit 23 in the voltage compensation processing unit 2, and the output from the control mode determining unit 4. Below is the outline of these configurational differences.

In the first embodiment, the voltage command value calculating unit 1 performs only a current vector control for the motor 200, but in this embodiment, either current vector control or voltage phase control is selected as a control mode. This selection is made by the control mode determining unit 4.

The control mode determining unit 4 outputs the control mode signal CTRL_mode indicating the selected control mode to the voltage command value calculating unit 1 (voltage command value switching unit 17) and the voltage compensation processing unit 2 (compensation limit switching unit 23). Further, as an example, the control mode determining unit 4 selects voltage phase control when it can be determined that the rotation speed of the motor 200 is in a high rotation region above a certain level, otherwise (when in a low rotation region), the control mode determining unit 4 selects current vector control.

Then, the voltage command value calculating unit 1 and the voltage compensation processing unit 2 perform processing according to the control mode indicated by the control mode signal CTRL_mode as shown below.

The voltage command value calculating unit 1 further includes a voltage amplitude generating unit 14, a voltage phase generating unit 15, a voltage phase control unit 16, and a voltage command value switching unit 17 as compared with the configuration of the first embodiment.

The command value of current vector control (the first voltage command value) is generated by the current command generating unit 11, the interference voltage generating unit 12, and the current vector control unit 13, which have the same configurations as those of the first embodiment. On the other hand, the command value of voltage phase control (the second voltage command value) is generated by the voltage amplitude generating unit 14, the voltage phase generating unit 15, and the voltage phase control unit 16. Then, the voltage command value switching unit 17 determines whether to use a command value by the control method of current vector control or voltage phase control.

The current command generating unit 11, the interference voltage generating unit 12, and the current vector control unit 13 perform the same processing as in the first embodiment. Then, the current vector control unit 13 outputs the first dq-axis voltage command value ($v_{di}^*$, $v_{qi}^*$), which is the command value used for current vector control, to the voltage command value switching unit 17. Further, the first dq-axis voltage command value ($v_{di}^*$, $v_{qi}^*$) corresponds to the dq-axis voltage command value ($v_d^*$, $v_q^*$) in the first embodiment, and the reference numeral has been changed for convenience of explanation in this embodiment.

The voltage amplitude generating unit 14 acquires the DC voltage $V_{dc}$ and a modulation factor command value $m^*$. Here, the modulation factor command value $m^*$ is a fixed value suitable as the value of the modulation factor m used when a voltage phase control is executed, and a value obtained in advance is set to be the modulation factor command value $m^*$.

The voltage amplitude generating unit 14 calculates the second voltage amplitude command value $V_{av}^*$ by using the DC voltage $V_{dc}$ and the modulation factor command value $m^*$ based on the following equation. Further, in order to distinguish the voltage amplitude command value used for voltage phase control from the voltage amplitude command value $V_a^*$ used in the current vector control shown in Equation (2) of the first embodiment, the voltage amplitude command value used for voltage phase control is referred to as the second voltage amplitude command value $V_{av}^*$.

[Equation 7]

$$m^* = \frac{\sqrt{2} \cdot V_{av}^*}{V_{dc}} \quad (7)$$

Then, the voltage amplitude generating unit 14 outputs the calculated second voltage amplitude command value $V_{av}^*$ to the voltage phase control unit 16.

The voltage phase generating unit 15 acquires the torque command value $T^*$, the motor rotation speed N, the DC voltage $V_{dc}$, and the modulation mode signal MOD_mode. Then, the voltage phase generating unit 15 calculates a voltage phase $\alpha^*$ with reference to a map predetermined by experiment or analysis based on these inputs. Then, the voltage phase generating unit 15 outputs the calculated voltage phase $\alpha^*$ to the voltage phase control unit 16.

More specifically, the modulation mode signal MOD_mode indicates whether a synchronous PWM control signal or an asynchronous PWM signal is used in the PWM control. Further, the voltage phase generating unit 15 calculates the voltage phase $\alpha^*$ based on a predetermined table, which is a table provided for each modulation mode to obtain the command value when a voltage phase control is performed, and is a table that defines the relation between the voltage phase $\alpha^*$ and the torque command value $T^*$, the motor rotation speed N, and the DC voltage $V_{dc}$. In addition, this table is predetermined by an experimental or analytical method.

The voltage phase control unit 16 acquires the torque command value $T^*$, and receives the second voltage amplitude command value $V_{av}^*$ from the voltage amplitude generating unit 14, the voltage phase $\alpha^*$ from the voltage phase generating unit 15, and the dq-axis current value ($i_d$, $i_q$) from the UVW-phase/dq-axis converting unit 35.

Then, the voltage phase control unit 16 calculates the torque estimation value $T_{cal}$ from the dq-axis current value ($i_d$, $i_q$), and further, calculates the second dq-axis voltage command value ($v_{dv}^*$, $v_{qv}^*$) based on the second voltage amplitude command value $V_{av}^*$, voltage phase $\alpha^*$, torque command value $T^*$, and dq-axis current value ($i_d$, $i_q$) so that the calculated torque estimation value $T_{cal}$ approaches the torque command value $T^*$. Then, the voltage phase control unit 16 outputs the calculated second dq-axis voltage command value ($v_{dv}^*$, $v_{qv}^*$) to the voltage command value switching unit 17.

The voltage command value switching unit 17 receives the first dq-axis voltage command value ($v_{di}^*$, $v_{qi}^*$) from the current vector control unit 13, the second dq-axis voltage command value ($v_{dv}^*$, $v_{qv}^*$) from the voltage phase control unit 16, and the control mode signal CTRL_mode from the control mode determining unit 4. Then, the voltage command value switching unit 17 calculates the dq-axis voltage command value ($v_d^*$, $v_q^*$) based on these values and signals, and outputs the dq-axis voltage command value ($v_d^*$, $v_q^*$) to the voltage compensation processing unit 2 and the voltage linear compensation unit 25. Further, the first dq-axis voltage command value ($v_{di}^*$, $v_{qi}^*$) is an example of the first voltage command value, and the second dq-axis voltage command value ($v_{dv}^*$, $v_{qv}^*$) is an example of the second voltage command value.

Specifically, the voltage command value switching unit 17 selects a command value of either current vector control or voltage phase control, and outputs it as the dq-axis voltage command value ($v_d^*$, $v_q^*$). When a current vector control is specified by the control mode signal CTRL_mode, the voltage command value switching unit 17 outputs the first dq-axis voltage command value ($v_{di}^*$, $v_{qi}^*$) as the dq-axis voltage command value ($v_d^*$, $v_q^*$). On the other hand, when a voltage phase control is specified, the voltage command value switching unit 17 outputs the second dq-axis voltage command value ($v_{dv}^*$, $v_{qv}^*$) as the dq-axis voltage command value ($v_d^*$, $v_q^*$).

Further, the determination about the carrier frequency $f_{carrier}$ in the voltage command value calculating unit 1 may be made in any block. For example, the values according to the control mode and the modulation mode among the total of four carrier frequency $f_{carrier}$, which are obtained two each according to the modulation mode, in each of the current command generating unit 11 and the voltage phase generating unit 15, may be output from the voltage command value switching unit 17.

Further, the differences in the voltage compensation processing unit 2 are as follows.

In the compensation limit switching unit 23, the control mode signal CTRL_mode is input instead of the modulation mode signal MOD_mode as compared with the first embodiment. Here, the control mode signal CTRL_mode indicates that either current vector control or voltage phase control is performed. Therefore, the compensation limit switching unit 23 sets the compensation gain upper limit value $K_{upper}$ according to the control mode signal CTRL_mode based on the following table.

TABLE 2

| CTRL_mode | $K_{upper}$ |
|---|---|
| current vector control | $K_{upper\_Current}$ |
| voltage phase control | $K_{upper\_Volt}$ |

Thereby, the compensation gain limiting unit 24 sets $K_{upper\_Current}$ as the compensation gain upper limit value $K_{upper}$ when a current vector control is performed, and sets $K_{upper\_Volt}$ as the compensation gain upper limit value $K_{upper}$ when a voltage phase control is performed. In addition, $K_{upper\_Current}$ is assumed to be smaller than $K_{upper\_Volt}$.

Figure 6:
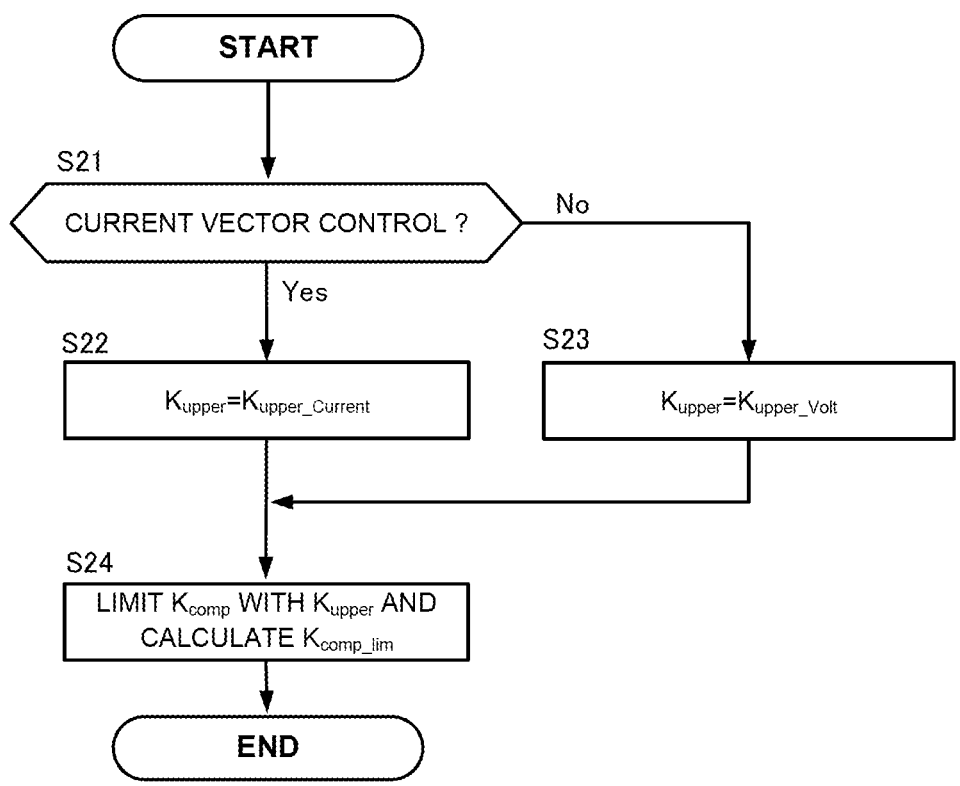
FIG. 6 is a flowchart illustrating a gain compensation control.

Here, similar to FIG. 3 in the first embodiment, FIG. 6 is used to describe a series of gain compensation controls performed by the compensation limit switching unit 23, the compensation gain limiting unit 24, and the voltage linear compensation unit 25.

In Step S21, the compensation limit switching unit 23 determines whether or not the control mode indicated by the control mode signal CTRL_mode is current vector control. Then, when a current vector control is performed (S21: Yes), the process of Step S22 is performed next. When no current vector control is performed (a voltage phase control is performed) (S21: No), the process of Step S23 is performed next.

In Step S22, the compensation limit switching unit 23 sets $K_{upper\_Current}$ as the compensation gain upper limit value $K_{upper}$. In Step S23, the compensation limit switching unit 23 sets $K_{upper\_Volt}$ as the compensation gain upper limit value $K_{upper}$.

Further, since $K_{upper\_Volt}$ is larger than $K_{upper\_Current}$, $K_{upper\_Current}$ may be obtained by adding a predetermined value to $K_{upper\_Volt}$ or multiplying $K_{upper\_Volt}$ by a predetermined ratio. These settings follow Table 2.

In Step S24, the compensation gain limiting unit 24 limits the compensation gain $K_{comp}$, which is output from the compensation gain calculating unit 22, so that the upper limit is the compensation gain upper limit value $K_{upper}$, and calculates the limited compensation gain $K_{comp\_lim}$.

In addition, when a mode switching indicated by the control mode signal CTRL_mode is detected, the compensation limit switching unit 23 switches the compensation gain upper limit value $K_{upper}$ between $K_{upper\_Current}$ and $K_{upper\_Volt}$, and the switching may be performed so as to change gradually instead of in a pulsed manner.

FIG. 7 is a timing chart illustrating an example of switching the compensation gain upper limit value $K_{upper}$. Similar to the switching shown in FIG. 1, $K_{upper\_Current}$ is set as $K_{upper}$ from time $t_0$ to $t_4$. Then, after switching the control mode, $K_{upper}$ gradually changes from $K_{upper\_Current}$ to $K_{upper\_Volt}$ from time $t_4$ to $t_6$, and $K_{upper}$ is set to $K_{upper\_Volt}$ at time $t_6$. By gradually switching $K_{upper}$ in this way, a sudden change in the upper limit value can be suppressed, and thus, the stability of control can be improved.

Note that $K_{upper\_Volt}$ may be set much larger than $K_{upper\_Current}$. This is because when a voltage phase control is performed, the modulation factor m is stable and the need for limiting the compensation gain $K_{comp}$ is extremely low. Further, a limiting processing may be performed on the compensation gain $K_{comp}$ only when a current vector control is performed. When a voltage phase control is performed, linear responsiveness can be maintained in a wider range of voltage by omitting limiting processing.

According to the second embodiment as described above, the following effects can be obtained.

In the control method of the control apparatus 100 of the second embodiment, the control mode determining unit 4 selects either current vector control or voltage phase control as the control mode for the motor 200. Here, the current vector control is less stable in the modulation factor m as compared with the voltage phase control.

Therefore, when current vector control is selected by the control mode determining unit 4, by using the relatively small $K_{upper\_Current}$ as the compensation gain upper limit value $K_{upper}$, the application of an excessive voltage to the motor 200 can be suppressed. As a result, changes in torque and current can be suppressed in the motor 200.

On the other hand, when voltage phase control is selected by the control mode determining unit 4, the change in the modulation factor m is small, and thus, by using the relatively large $K_{upper\_Sync}$ as the compensation gain upper limit value $K_{upper}$, the controllability of the motor 200 can be improved since the voltage range in which linear responsiveness can be ensured becomes large. Further, linear responsiveness may be ensured in the entire voltage range by omitting the limitation on the compensation gain $K_{comp}$.

Third Embodiment

In the third embodiment, an example of setting the compensation gain upper limit value $K_{upper}$ using other parameters will be described.

Figure 8:
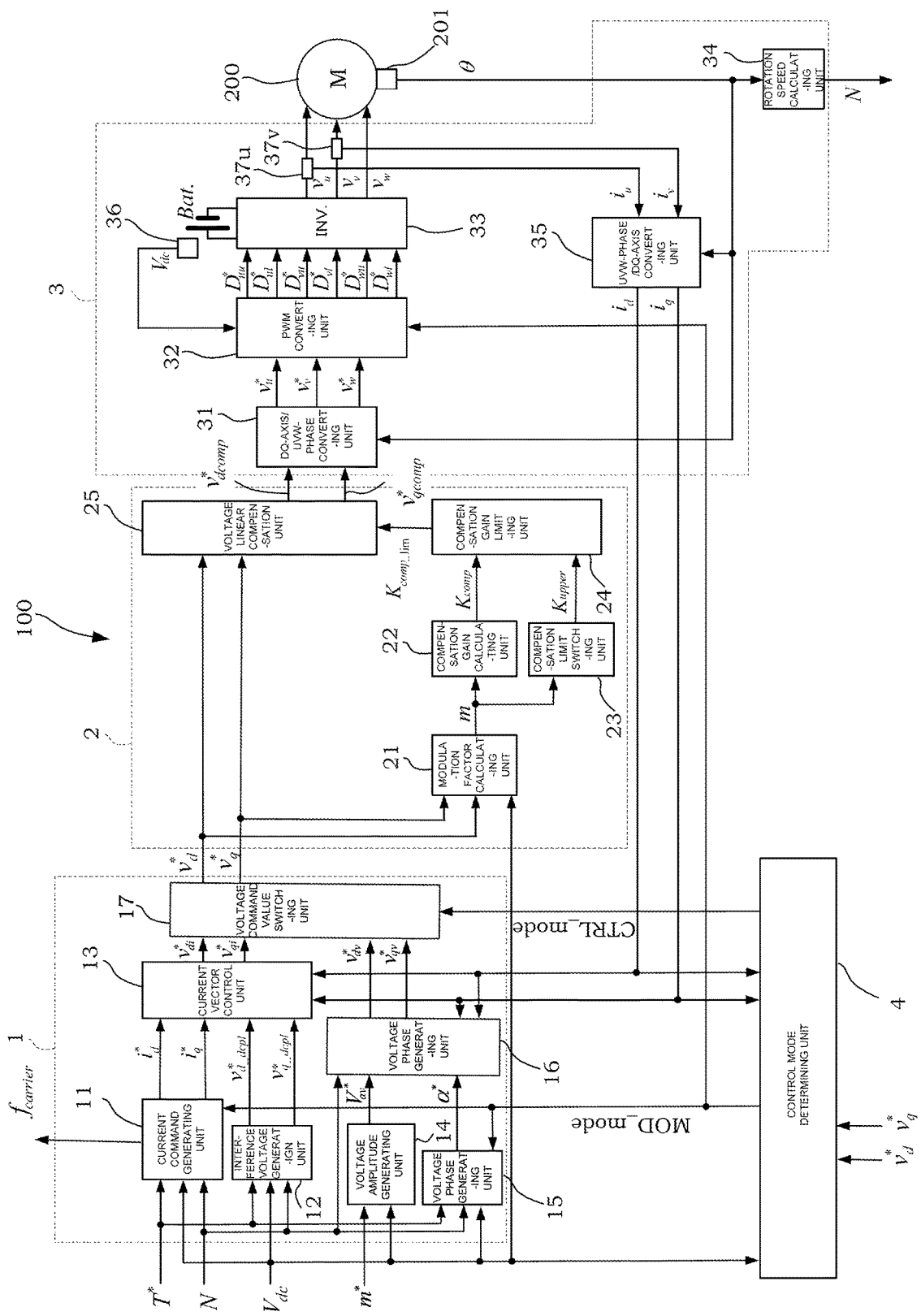
FIG. 8 is a schematic configuration diagram illustrating a motor control apparatus according to a third embodiment.

FIG. 8 is a schematic configuration diagram illustrating the control apparatus 100 of the motor 200 of the third embodiment. According to this schematic configuration diagram, as compared with the schematic configuration diagram of FIG. 6 in the second embodiment, there are differences in the input to the compensation limit switching unit 23 in the voltage compensation processing unit 2.

In the compensation limit switching unit 23, only the modulation factor m is input, and there is neither input of the control mode signal CTRL_mode as in the first embodiment nor input of the control mode signal CTRL_mode as in the second embodiment. The compensation limit switching unit 23 sets the compensation gain upper limit value $K_{upper}$ according to the modulation factor m based on the following table.

TABLE 3

| m | $K_{upper}$ |
|---|---|
| $m < m_{th}$ | $K_{upper\_Low}$ |
| $m \geq m_{th}$ | $K_{upper\_High}$ |

Thereby, the compensation gain limiting unit 24 sets $K_{upper\_Low}$ as the compensation gain upper limit value $K_{upper}$ when the modulation factor m is smaller than a switching determination modulation factor $m_{th}$, and sets $K_{upper\_High}$ as the compensation gain upper limit value $K_{upper}$ when the modulation factor m is equal to or larger than the switching determination modulation factor $m_{th}$. In addition, $K_{upper\_High}$ is assumed to be larger than $K_{upper\_Low}$.

Figure 9:
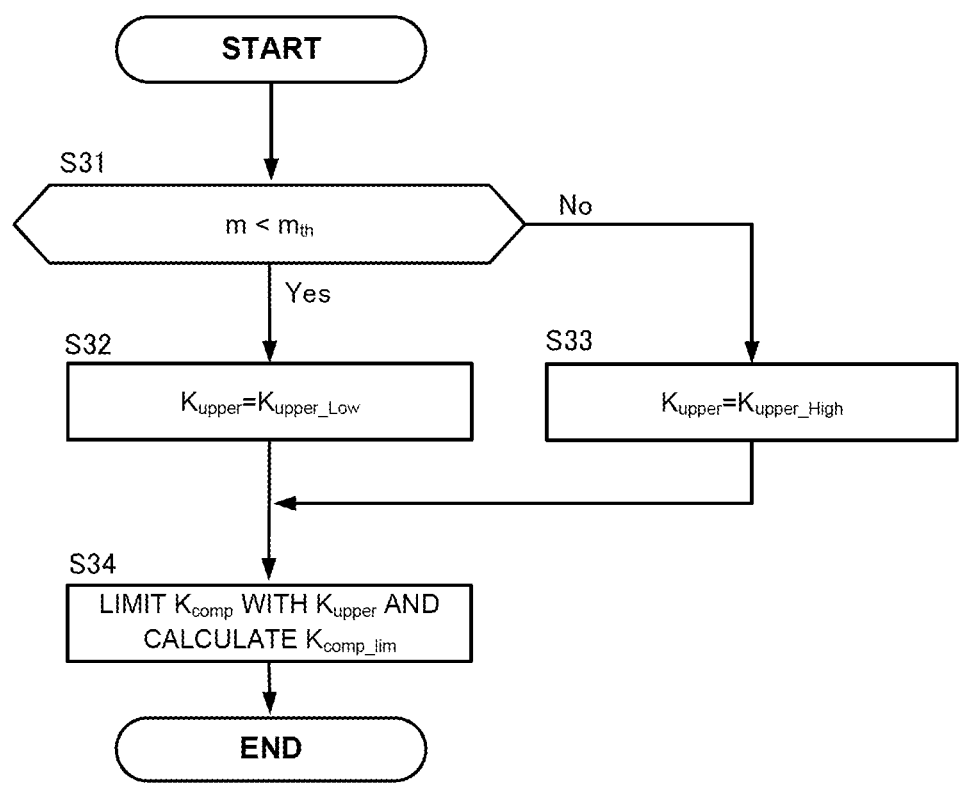
FIG. 9 is a flowchart illustrating a gain compensation control.

Here, a series of gain compensation controls performed by the compensation limit switching unit 23, the compensation gain limiting unit 24, and the voltage linear compensation unit 25 will be described with reference to FIG. 9.

In Step S31, the compensation limit switching unit 23 determines whether or not the modulation factor m is smaller than the switching determination modulation factor $m_{th}$. Then, when the modulation factor m is smaller than the switching determination modulation factor $m_{th}$ ($m<m_{th}$) (S31: Yes), the process of Step S32 is performed next. When the modulation factor m is not smaller than the switching determination modulation factor $m_{th}$ (m $m_{th}$) (S31: No), the process of Step S33 is performed next.

In Step S32, the compensation limit switching unit 23 sets $K_{upper\_Low}$ as the compensation gain upper limit value $K_{upper}$. In Step S33, the compensation limit switching unit 23 sets $K_{upper\_High}$ as the compensation gain upper limit value $K_{upper}$. Further, since $K_{upper\_High}$ is larger than $K_{upper\_Low}$, $K_{upper\_High}$ may be obtained by adding a predetermined value to $K_{upper\_Low}$ or multiplying $K_{upper\_Low}$ by a predetermined ratio. These settings follow Table 3.

In Step S34, the compensation gain limiting unit 24 limits the compensation gain $K_{comp}$, which is output from the compensation gain calculating unit 22, so that the upper limit is the compensation gain upper limit value $K_{upper}$, and calculates the limited compensation gain $K_{comp\_lim}$.

In addition, when the modulation factor m exceeds the switching determination modulation factor $m_{th}$ in a state where the modulation factor m is changing to increase over time, the compensation limit switching unit 23 switches the compensation gain upper limit value $K_{upper}$ from $K_{upper\_Low}$ to $K_{upper\_High}$, and the switching may be performed so as to change gradually instead of in a pulsed manner.

Figure 10:
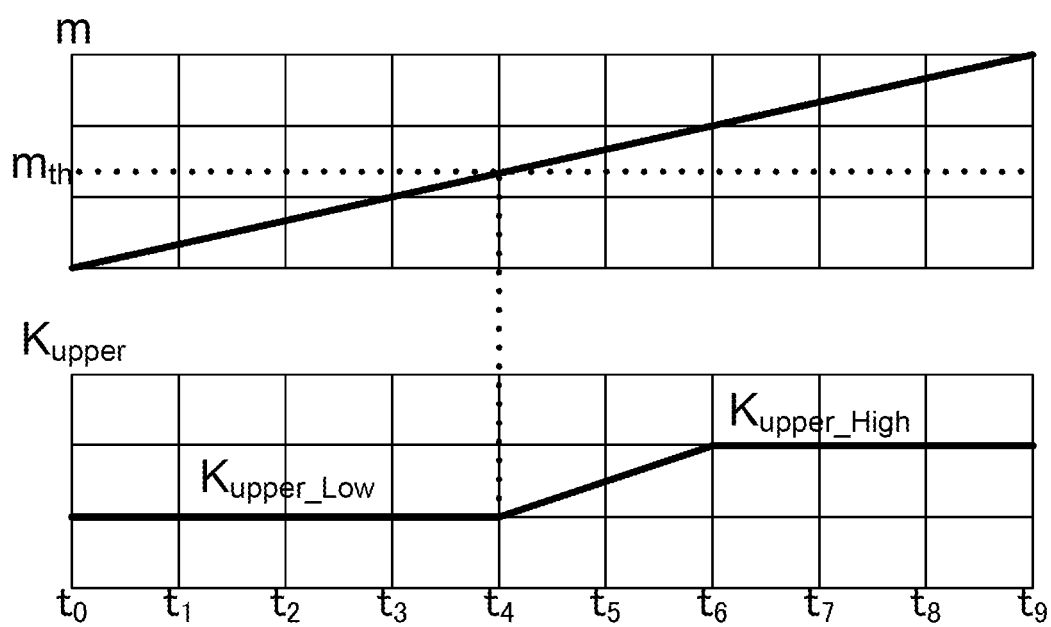
FIG. 10 is a timing chart at a time of switching an upper limit value of compensation gain.

FIG. 10 is a timing chart illustrating an example of switching the compensation gain upper limit value $K_{upper}$. Similar to the switching shown in FIG. 1, $K_{upper\_Low}$ is set as $K_{upper}$ from time $t_0$ to $t_4$. The modulation factor m gradually increases and exceeds the switching determination modulation factor $m_{th}$ at time $t_4$. As a result, the setting value of $K_{upper}$ is switched at time $t_4$.

After the modulation factor m exceeds the switching determination modulation factor $m_{th}$ at this time $t_4$, $K_{upper}$ gradually changes from $K_{upper\_Low}$ to $K_{upper\_High}$ from time $t_4$ to $t_6$, and after time $t_6$, $K_{upper}$ is set to $K_{upper\_High}$. By gradually switching $K_{upper}$ in this way, a sudden change in the upper limit value can be suppressed, and thus, the stability of control can be improved.

Note that $K_{upper\_High}$ may be set much larger than $K_{upper\_Low}$. This is because when the modulation factor m is relatively small, the modulation factor m is stable and the need for limiting the compensation gain $K_{comp}$ is extremely low. Further, a limiting processing may be performed on the compensation gain $K_{comp}$ only when the modulation factor m is relatively small. When the modulation factor m is relatively large, linear responsiveness can be maintained in a wider range of voltage by omitting limiting processing.

According to the third embodiment, the following effects can be obtained.

In the control method of the control apparatus 100 of the third embodiment, the compensation gain limiting unit 24 sets $K_{upper\_Low}$ as the compensation gain upper limit value $K_{upper}$ (S32) when the modulation factor m is smaller than the switching determination modulation factor $m_{th}$ (S31: Yes), and sets $K_{upper\_High}$ as the compensation gain upper limit value $K_{upper}$ (S33) when the modulation factor m is equal to or larger than the switching determination modulation factor $m_{th}$ (S31: No).

In the control apparatus 100, a feedback control using the input from the motor 200, which is the target to be controlled, is performed. In the feedback system, a filtered feedback input from the motor 200 is used. Here, the compensation gain $K_{comp}$ is limited in the process of calculating the command value, and thus, even if this limitation ensures linear responsiveness between the command value and the output, there will be a time lag before the output is fed back to the control device 100 again. Therefore, if the modulation factor m changes during this time lag, the feedback control may fail to be performed properly.

Here, the smaller the modulation factor m, the higher the possibility that a time lag will occur in the feed back control system, and the feedback control system may become unstable due to changes in the modulation factor m. Therefore, when the modulation factor m is smaller than the switching determination modulation factor $m_{th}$, by using the relatively small $K_{upper\_Low}$ as the compensation gain upper limit value $K_{upper}$, it will be easier to ensure linearity even in a situation where a time lag occurs. As a result, changes in torque and current can be suppressed in the motor 200.

Fourth Embodiment

In the fourth embodiment, an example of setting the compensation gain upper limit value $K_{upper}$ using other parameters will be further described.

Figure 11:
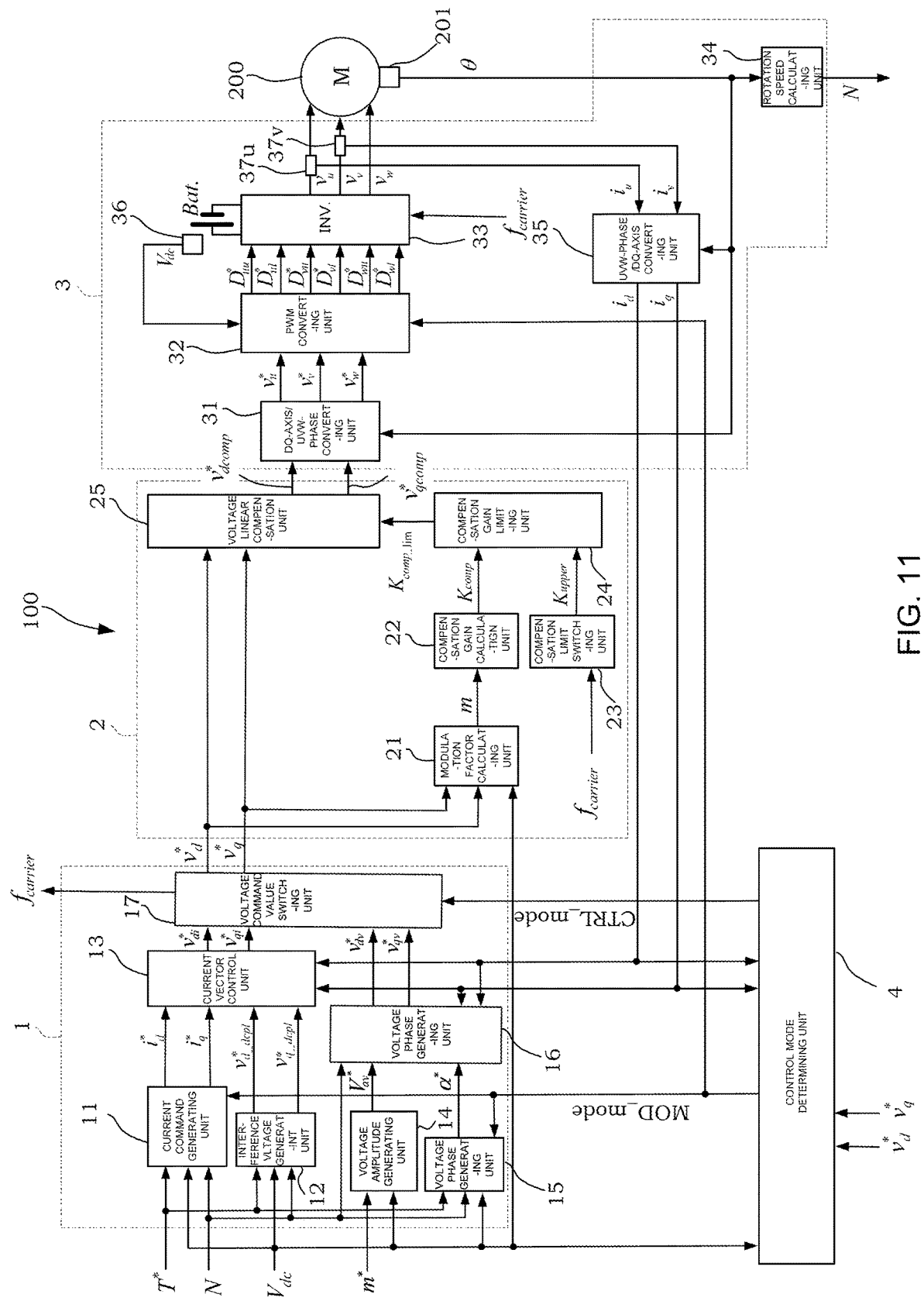
FIG. 11 is a schematic configuration diagram illustrating a motor control apparatus according to a fourth embodiment.

FIG. 11 is a schematic configuration diagram illustrating the control apparatus 100 of the motor 200 in the fourth embodiment. According to this schematic configuration diagram, as compared with the schematic configuration diagram of FIG. 6 in the second embodiment, there are differences in the input to the compensation limit switching unit 23 in the voltage compensation processing unit 2.

In the compensation limit switching unit 23, the carrier frequency $f_{carrier}$ is input from the voltage command value calculating unit 1 (voltage command value switching unit 17), and there is no input of the modulation mode signal MOD_mode as in the first embodiment, the control mode signal CTRL_mode as in the second embodiment, or the modulation factor m as in the third embodiment. Therefore, the compensation limit switching unit 23 sets the compensation gain upper limit value $K_{upper}$ according to the carrier frequency $f_{carrier}$ based on the following table.

TABLE 4

| m | $K_{upper}$ |
|---|---|
| $f_{carrier} < f_{th}$ | $K_{upper\_Low}$ |
| $f_{carrier} \geq f_{th}$ | $K_{upper\_High}$ |

Thereby, the compensation gain limiting unit 24 sets $K_{upper\_Low}$ as the compensation gain upper limit value $K_{upper}$ when the carrier frequency $f_{carrier}$ is smaller than a switching determination frequency $f_{th}$, and sets $K_{upper\_High}$ as the compensation gain upper limit value $K_{upper}$ when the carrier frequency $f_{carrier}$ is equal to or larger than the switching determination frequency $f_{th}$. In addition, $K_{upper\_High}$ is assumed to be larger than $K_{upper\_Low}$.

Figure 12:
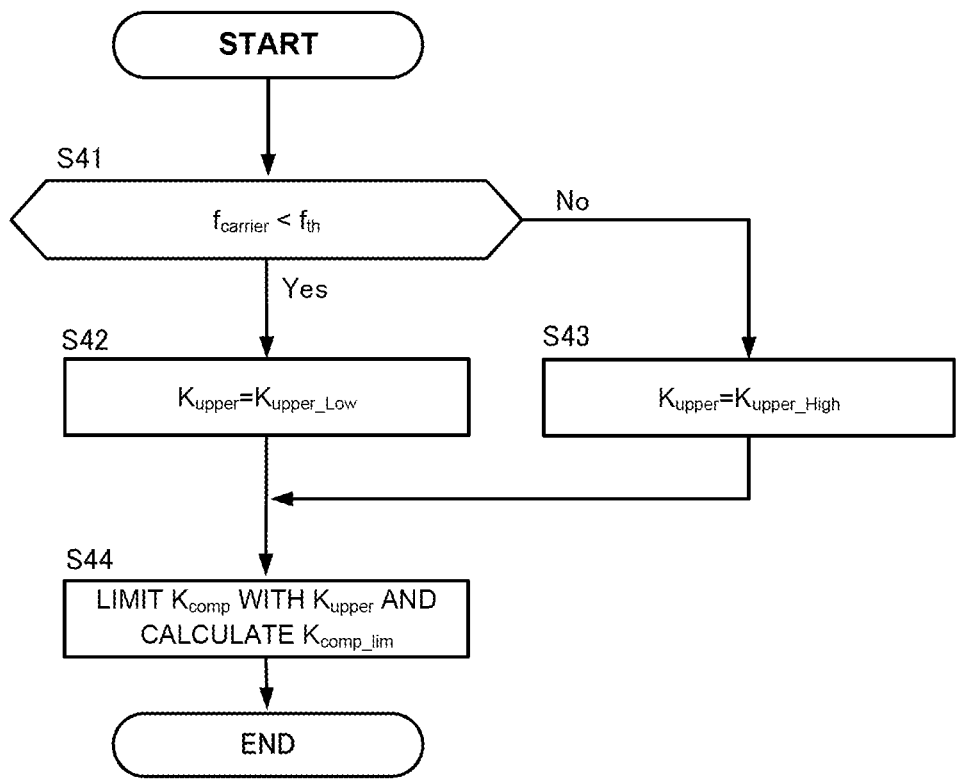
FIG. 12 is a flowchart illustrating a gain compensation control.

Here, a series of gain compensation controls performed by the compensation limit switching unit 23, the compensation gain limiting unit 24, and the voltage linear compensation unit 25 will be described with reference to FIG. 12.

In Step S41, the compensation limit switching unit 23 determines whether or not the carrier frequency $f_{carrier}$ is smaller than the switching determination frequency $f_{th}$. Then, when the carrier frequency $f_{carrier}$ is smaller than the switching determination frequency $f_{th}$ ($f_{carrier}<f_{th}$) (S41: Yes), the process of Step S42 is performed next. When the carrier frequency $f_{carrier}$ is not smaller than the switching determination frequency $f_{th}$ ($f_{carrier} \geq f_{th}$) (S41: No), the process of Step S43 is performed next.

In Step S42, the compensation limit switching unit 23 sets $K_{upper\_Low}$ as the compensation gain upper limit value $K_{upper}$. In Step S43, the compensation limit switching unit 23 sets $K_{upper\_High}$ as the compensation gain upper limit value $K_{upper}$. Further, since $K_{upper\_High}$ is larger than $K_{upper\_Low}$, $K_{upper\_High}$ may be obtained by adding a predetermined value to $K_{upper\_Low}$ or multiplying $K_{upper\_Low}$ by a predetermined ratio. These settings follow Table 4.

In Step S44, the compensation gain limiting unit 24 limits the compensation gain $K_{comp}$, which is output from the compensation gain calculating unit 22, so that the upper limit is the compensation gain upper limit value $K_{upper}$, and calculates the limit compensation gain $K_{comp\_lim}$.

In addition, when the carrier frequency $f_{carrier}$ exceeds the switching determination frequency $f_{th}$ in a state where the carrier frequency $f_{carrier}$ is changing to increase over time, the compensation limit switching unit 23 switches the compensation gain upper limit value $K_{upper}$ from $K_{upper\_Low}$ to $K_{upper\_High}$, and the switching may be performed so as to change gradually instead of in a pulsed manner.

Figure 13:
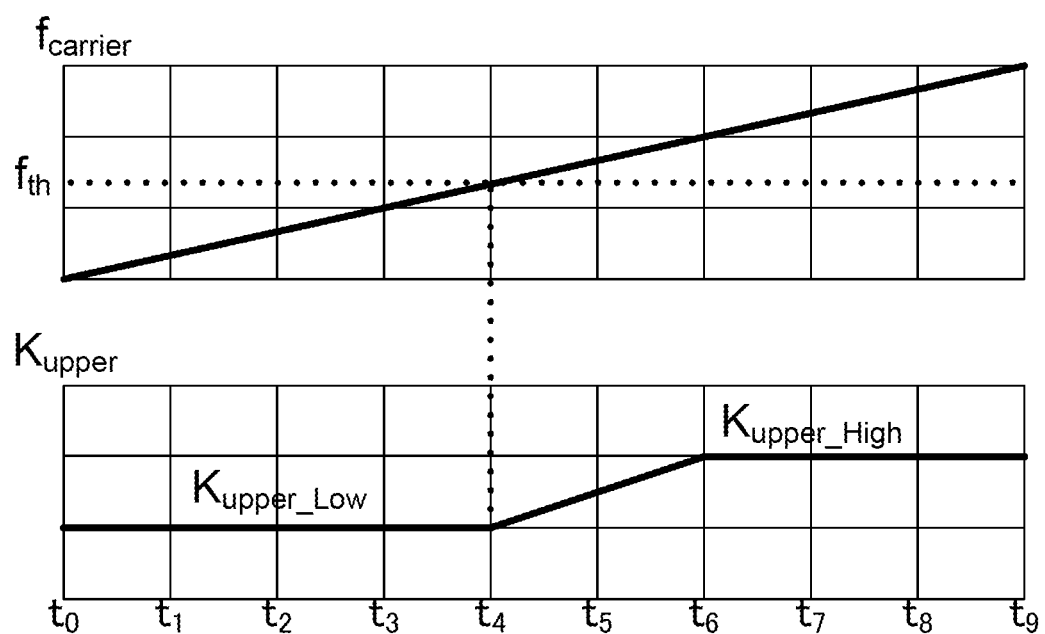
FIG. 13 is a timing chart at a time of switching an upper limit value of compensation gain.

FIG. 13 is a timing chart illustrating an example of switching the compensation gain upper limit value $K_{upper}$. Similar to the switching shown in FIG. 1, $K_{upper\_Low}$ is set as $K_{upper}$ from time $t_0$ to $t_4$. The carrier frequency $f_{carrier}$ gradually increases and exceeds the switching determination frequency $f_{th}$ at time $t_4$. As a result, the setting value of $K_{upper}$ is switched at time $t_4$.

After the carrier frequency $f_{carrier}$ exceeds the switching determination frequency $f_{th}$ at the time $t_4$, $K_{upper}$ gradually changes from $K_{upper\_Low}$ to $K_{upper\_High}$ from time $t_4$ to $t_6$, and after time $t_6$, $K_{upper}$ is set to $K_{upper\_High}$. By gradually switching $K_{upper}$ in this way, a sudden change in the upper limit value can be suppressed, and thus, the stability of control can be improved.

Note that $K_{upper\_High}$ may be set much larger than $K_{upper\_Low}$. This is because when the carrier frequency $f_{carrier}$ is relatively small, the modulation factor m is stable and the need for limiting the compensation gain $K_{comp}$ is extremely low. Further, a limiting processing may be performed on the compensation gain $K_{comp}$ only when the carrier frequency $f_{carrier}$ is relatively small. When the carrier frequency $f_{carrier}$ is relatively large, linear responsiveness can be maintained in a wider range of voltage by omitting limiting processing.

According to the fourth embodiment, the following effects can be obtained.

In the control method of the control apparatus 100 of the fourth embodiment, the compensation gain limiting unit 24 sets $K_{upper\_Low}$ as the compensation gain upper limit value $K_{upper}$ (S42) when the carrier frequency $f_{carrier}$ is smaller than the switching determination frequency $f_{th}$ (S41: Yes), and sets $K_{upper\_High}$ as the compensation gain upper limit value $K_{upper}$ (S43) when the carrier frequency $f_{carrier}$ is equal to or larger than the switching determination frequency $f_{th}$ (S41: No).

Here, the smaller the carrier frequency $f_{carrier}$, the higher the possibility that the modulation factor m in the PWM control becomes unstable. Therefore, when the carrier frequency $f_{carrier}$ is smaller than the switching determination frequency $f_{th}$, by using the relatively small $K_{upper\_Low}$ as the compensation gain upper limit value $K_{upper}$, the application of an excessive voltage to the motor 200 can be suppressed when the modulation factor m suddenly increases, etc. As a result, changes in torque and current can be suppressed in the motor 200.

While the embodiments of the present invention have been described above, the above-described embodiments only show part of application examples of the present invention and are not intended to limit the technical scope of the present invention to the specific configurations of the above-described embodiments.

For example, the various operations/controls in the voltage command value calculating unit 1, the voltage compensation processing unit 2, and the output control unit 3 described in the above embodiments are examples, and are not limited to the above embodiments.

Further, in each of the above embodiments, an example of the motor 200 operating in three phases as an electric motor has been described, but it is also possible to apply the configuration of each of the above embodiments to a motor other than three-phase motor. Further, in each of the above embodiments, the description has been made assuming that the control apparatus 100 controls the motor 200 mounted on the electric vehicle. However, the configuration of the electric motor control apparatus of the present invention may be applied to a motor used in various other apparatuses such as home appliances, industrial apparatuses, and medical apparatuses other than electric vehicle.

The invention claimed is:

1. A motor control method for controlling a motor by using an applied AC voltage converted from a DC voltage with an inverter driven by a PWM control, comprising:
   calculating a voltage command value for the inverter in order to achieve a desired torque output in the motor;
   calculating a compensation gain configured to maintain a linear relation between the voltage command value and the applied AC voltage according to a modulation factor indicating a ratio of the applied AC voltage to the DC voltage before and after a conversion in the inverter;
   limiting the compensation gain using an upper limit value;
   calculating a compensation voltage command value by multiplying the voltage command value by the limited compensation gain; and
   applying the applied AC voltage to the motor by driving the inverter using the compensation voltage command value; wherein the upper limit value is set so that the upper limit value becomes smaller when the modulation factor changes significantly.

2. The motor control method according to claim 1, wherein:
the upper limit value is set larger or the limitation on the compensation gain using the upper limit value is omitted, when the modulation factor changes slightly.

3. The motor control method according to claim 1, further comprising:
determining whether to perform a synchronous PWM control or an asynchronous PWM control in the PWM control; wherein
a case where the modulation factor changes significantly is a case where it is determined that the asynchronous PWM control is to be performed.

4. The motor control method according to claim 1, further comprising:
determining whether a torque control of the motor is to be performed by either a current vector control or a voltage phase control; wherein
a case where the modulation factor changes significantly is a case where it is determined that the current vector control is to be performed.

5. The motor control method according to claim 1, wherein:
a case where the modulation factor changes significantly is a case where it is determined that the modulation factor is smaller than a predetermined threshold.

6. The motor control method according to claim 1, wherein:
a case where the modulation factor changes significantly is a case where it is determined that a carrier frequency used in the PWM control is smaller than a predetermined threshold value.

7. A motor control apparatus, comprising:
an inverter driven by a PWM control; and
a controller that operates the inverter and controls a motor using an applied AC voltage converted from a DC voltage with the inverter; wherein
the controller is configured
to calculate a voltage command value for the inverter in order to achieve a desired torque output in the motor;
to calculate a compensation gain configured to maintain a linear relation between the voltage command value and the applied AC voltage according to a modulation factor indicating a ratio of the applied AC voltage to the DC voltage before and after a conversion by the inverter;
to limit the compensation gain using an upper limit value;
to calculate a compensation voltage command value by multiplying the voltage command value by the limited compensation gain; and
to apply the applied AC voltage to the motor by driving the inverter using the compensation voltage command value; wherein
the upper limit value is set so that the upper limit value becomes smaller as the modulation factor changes more significantly.

\* \* \* \* \*